United States Patent [19]

Runkle

[11] Patent Number: 4,540,109
[45] Date of Patent: Sep. 10, 1985

[54] PROCESS FOR SEVERING A TUBE SHEET

[75] Inventor: Charles J. Runkle, Wake County, N.C.

[73] Assignee: Monsanto Company, St. Louis, Mo.

[21] Appl. No.: 553,947

[22] Filed: Nov. 21, 1983

[51] Int. Cl.³ .............................................. B26F 3/00
[52] U.S. Cl. ............................................ 225/1; 225/93
[58] Field of Search ................ 225/1, 2, 93, 965, 103; 29/413–415

[56] References Cited

U.S. PATENT DOCUMENTS

| | | | |
|---|---|---|---|
| 3,475,229 | 10/1969 | Green et al. | 225/1 X |
| 3,503,288 | 3/1970 | Swartling | 82/48 |
| 3,615,047 | 10/1971 | Feldman et al. | 225/1 |
| 3,656,671 | 4/1972 | Bratek | 225/1 |
| 4,183,283 | 1/1980 | Danos et al. | 90/11 |
| 4,271,740 | 6/1983 | Yamazaki et al. | 83/592 |
| 4,369,605 | 1/1983 | Opersteny et al. | 51/319 |

Primary Examiner—Frank T. Yost
Attorney, Agent, or Firm—R. L. Broad, Jr.

[57] ABSTRACT

A process for severing a polymeric tube sheet to expose bores of the hollow fibers embedded in the tube sheet wherein the tube sheet is provided with a circumferential stress raiser and compressive forces are applied to the tube sheet to fracture off a portion of the tube sheet at the stress raiser to expose the bores of the hollow fibers embedded therein.

7 Claims, 6 Drawing Figures

PROCESS FOR SEVERING A TUBE SHEET

BACKGROUND OF THE INVENTION

1. Field of the Invention

This invention relates to methods for severing tube sheets to expose the bores of hollow fiber embedded thereon.

2. Prior Art

In making a certain type of membrane gas separator the end of a bundle of hollow fiber membranes is positioned in a cylindrical mold and a liquid casting resin is poured into the mold and cured to a solid state. The purpose of the casting is to serve as a tube sheet when the fiber bundle is placed in a cylindrical shell. In order to remove gases which permeate to the bores of the fibers it is necessary to transversely sever the tube sheet to expose the fiber bores. A major problem with this is that almost every type of cutting process results in smearing the relatively soft fibers and closing the bores thereof. Various attempts have been made to avoid this problem.

U.S. Pat. No. 4,183,283 discloses that a tube sheet can be severed in any suitable manner and then a thin layer of the tube sheet is removed by using a knife blade to scrape the severed face of the tube sheet to open the bores of hollow fibers embedded in the tube sheet.

U.S. Pat. No. 4,271,740 discloses apparatus for cutting a tube sheet having a fiber bundle embedded therein, the apparatus being provided with a pair of blades positioned at different angles.

U.S. Pat. No. 4,369,605 discloses the opening of bores in a cast tube sheet by severing the tube sheet and then grit-blasting the severed face of the tube sheet to open the fiber bores.

U.S. Pat. No. 3,503,288 discloses a method for cutting hollow plastic filaments embedded in a solid plastic matrix to expose the bores of the filaments wherein the end of the tube sheet is brought into contact with a cutter and is then rotated such that the cutter trims the end of the tube sheet. This patent states that attempts have been made to fracture a tube sheet by the use of a controlled bending force or a shaped explosive charge. The patent further states that, when an attempt is made to fracture a tube sheet larger than two inches in diameter, the resultant fracture is erratic, difficult to predict and usually damages beyond repair the integrity of the seal between the cast wall, hollow filaments and the casing in which the tube sheet is mounted.

SUMMARY OF THE INVENTION

Process for severing a brittle polymeric tube sheet to expose bores of hollow fibers embedded in the tube sheet wherein compressive forces are applied to the tube sheet to fracture it at a stress raiser.

DETAILED DESCRIPTION OF THE INVENTION

Figure 1:
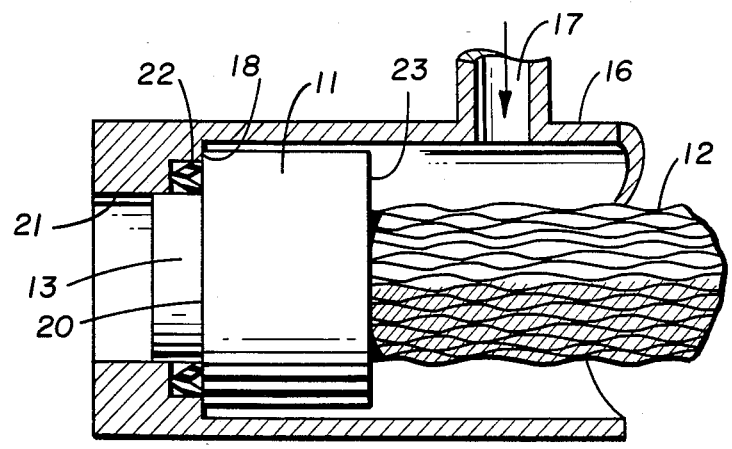
FIG. 1 is a fragmentary cross-sectional view showing apparatus which may be used for fracturing off a protuberance of a generally cylindrical polymeric tube sheet to expose the bores of hollow fibers embedded in the tube sheet.

Referring now in detail to the drawings, there is shown in FIG. 1 apparatus for fracturing a cylindrical tube sheet 11 to expose the bores of hollow fiber membranes making up a bundle 12, the end of the bundle 12 being embedded in the tube sheet 11. The tube sheet 11 is made from a cast polymeric material and has a cylindrical protuberance 13 which is concentric with and an integral part of the tube sheet 11. The tube sheet 11 is made by positioning the end of the fiber bundle 12 in a mold having the configuration of the tube sheet and the protuberance 13 and then pouring a casting resin into the mold and curing it. The tube sheet 11 is made from a polymeric material such as disclosed in U.S. Pat. No. 4,183,890 and has a Shore A hardness of at least 80 in order that the tube sheet be sufficiently brittle that it can be fractured.

The tube sheet 11 and the fiber bundle 12 are placed in a closed cylindrical chamber 16 having an inlet 17 for the admission of a fluid such as compressed air. An annular shoulder 18 on the shell 16 contacts a rear face 20 of the cylindrical tube sheet 11 to provide for the tube sheet 11 a support which extends around the periphery of the face 20.

The protuberance 13 of the tube sheet 11 extends into an opening 21 in the shell 16, with a seal 22 being provided for preventing leakage of the compressed fluid from the shell 16.

Figure 2:
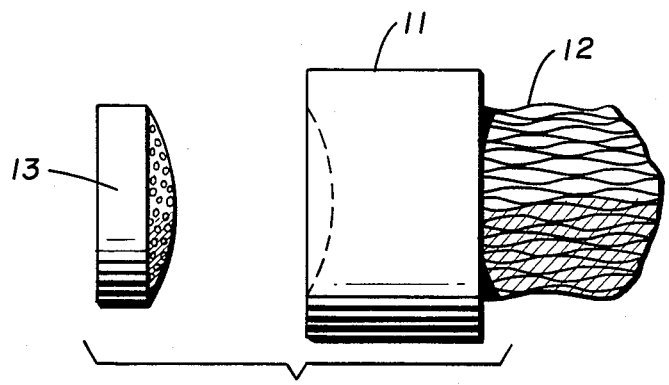
FIG. 2 is a side view showing a tube sheet which has been fractured by using the apparatus of FIG. 1.

With the tube sheet positioned in the apparatus as shown in FIG. 1, compressed air is admitted to the shell 16 to apply pressure to a front face 23 of the tube sheet 11 from which the fiber bundle 12 protrudes. As the pressure of the fluid is increased, compressive forces on the tube sheet 11 are increased and are concentrated at the junction between the tube sheet 11 and the protuberance 13, this junction serving as a stress raiser which extends circumferentially around the tube sheet. As the pressure of the fluid is increased, the compressive forces on the tube sheet 11 will increase to the point where the protuberance 13 fractures off the tube sheet as shown in FIG. 2. Inasmuch as the fiber bundle 12 extends into the protuberance 13, this severs the fibers and leaves almost all of the bores of the fibers completely open. Tube sheets sufficiently large to contain fiber bundles 12 of over 20 centimeters (8 inches) diameter have been successfully fractured by this process. The result is a clean break with almost all of the fiber bores being open.

Figure 3:
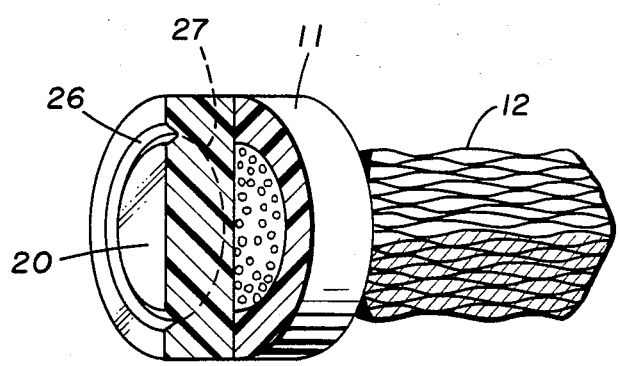
FIG. 3 is a fragmentary perspective view showing a polymeric tube sheet which is provided with a groove which serves as a stress raiser for concentrating stresses to fracture off a portion of the tube sheet.

FIG. 3 shows the second embodiment of tube sheet which can be fractured using the apparatus of FIG. 1, with an appropriate seal (not shown) for preventing leakage of the compressed air. In this embodiment, the stress raiser is in the form of a groove 26 in the back face 20 and concentric with the tube sheet 11. That portion of the tube sheet 11 lying between the dashed line 27 and the back face 20 of the tube sheet 11 will be fractured off to expose the fiber bores.

Figure 4:
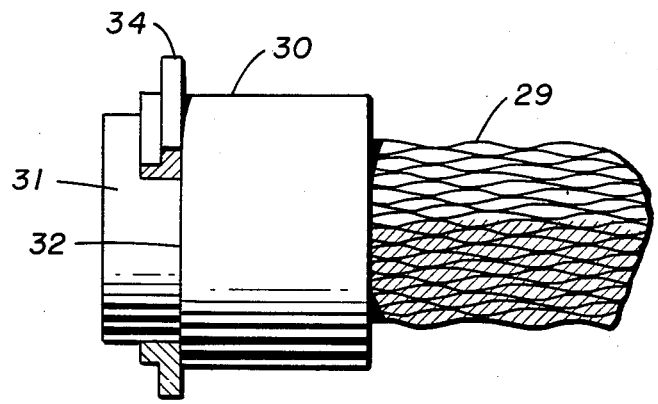
FIG. 4 is a fragmentary side view illustrating a second embodiment of the invention wherein the tube sheet is fractured by restricting the expansion of a portion of the tube sheet as the tube sheet is heated.
Figure 5:
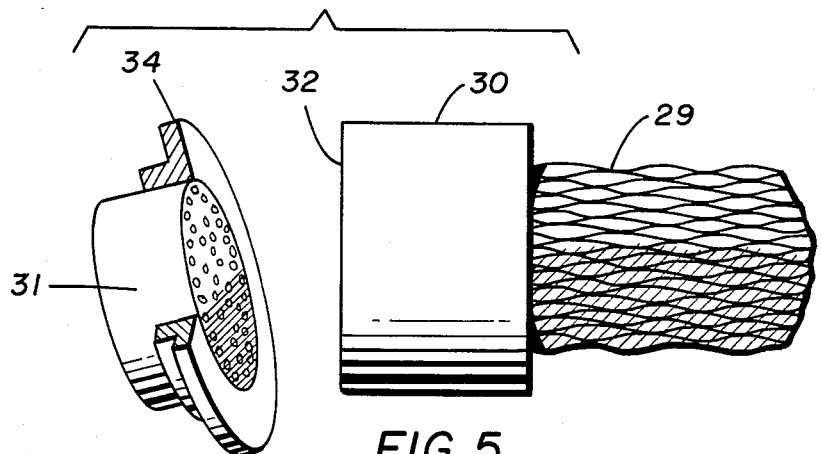
FIG. 5 is a fragmentary view showing the manner in which a portion of the tube sheet of FIG. 4 is fractured off to expose bores of hollow fibers embedded in the tube sheet.
Figure 6:
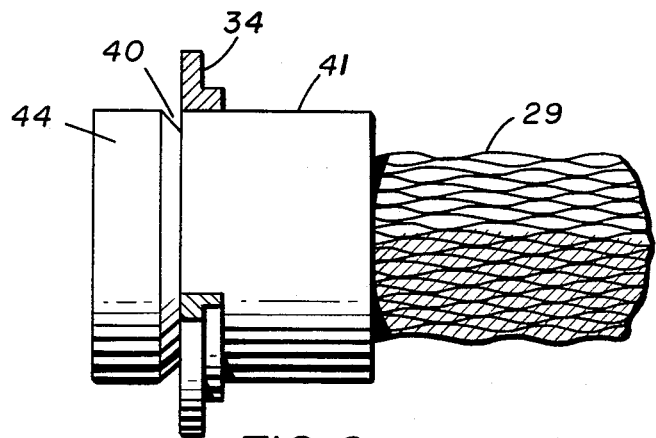
FIG. 6 is a side view of another tube sheet configuration which may be used in the process of this invention, this tube sheet being provided with a groove which serves as a stress raiser.

FIGS. 4, 5 and 6 show a second embodiment of the process for fracturing a tube sheet to expose the bores of fibers of a bundle 29 embedded therein. A tube sheet 30 is cast from a polymeric resin such as that described above to have a cylindrical protuberance 31 concentric with and extending from a back face 32 of the tube sheet 30. A ring 34, preferably made from a metal such as ordinary carbon steel, having a coefficient of expansion less than the coefficient of expansion of the material of the tube sheet 30 is slipped onto the protuberance 31 to the position shown in FIG. 4, the ring 34 being just large enough to be manually positioned on the protuberance 31. The ring 34 may be made from any metal or other material having a coefficient of expansion less than the material of the tube sheet and a sufficient strength that it will not be broken by expansion of the tube sheet.

The tube sheet 30 with the protuberance 31 and the ring 16 are then placed in a heated environment to raise the temperature of these parts. Increasing temperatures cause the tube sheet 30 to expand at a faster rate than the ring 34 to cause compressive stress on the protuberance 31 at a location adjacent to the junction of the tube sheet 30 and the protuberance 31, this junction serving as a stress raiser. As the temperature of the tube sheet is increased, compressive forces on the protuberance will increase and be concentrated at the stress raiser until the point at which these concentrated forces cause the protuberance 31 to fracture off the tube sheet as best shown in FIG. 5. Inasmuch as the hollow fibers extend into the protuberance 31, this will break off those portions of the fibers in the protuberance 31 to leave almost 100 percent of the fiber bores exposed.

FIG. 6 shows a tube sheet configuration wherein the stress raiser is in the form of a groove 40 in a tube sheet 41. In this case, the ring 34 is positioned on the tube sheet 41 adjacent to the groove 40. The compressive stresses caused by heating the tube sheet will be concentrated at the groove 40 and cause a portion 44 of the tube sheet to fracture off from the remainder of the tube sheet to leave the fiber bores open.

This process of severing a tube sheet can be carried out by an unskilled operator and results in almost 100 percent of the fiber bores being open. Tube sheets over 20 centimeters (8 inches) in diameter can be cleanly fractured without damage to other parts of the tube sheet. The process can also be used for fracturing polymeric tube sheets of the type used in heat exchangers which use hollow polymeric tubes and a polymeric tube sheet.

I claim:

1. A process for severing a brittle polymeric tube sheet to expose bores of hollow fibers having the ends thereof embedded in the tube sheet, said tube sheet having a cylindrical configuration with a rear face and a front face from which said fibers protrude, said rear face having a circular stress raiser extending circumferentially around the axis of the said tube sheet, comprising
    (a) supporting the tube sheet at points on the rear face of said tube sheet, said points being arranged in a circle having a diameter greater than the diameter of the stress raiser, and
    (b) applying a fluid under pressure to the front face of the tube sheet said pressure being sufficient to stress the tube sheet to the point where a portion of the tube sheet surrounded by the stress raiser fractures off the tube sheet to expose ends of the hollow fibers in the tube sheet.

2. The process of claim 1 wherein the stress raiser on the rear face of the tube sheet is concentric with the axis of said tube sheet.

3. The process of claim 2 wherein the tube sheet is supported by an annular support having a diameter greater than the diameter of the stress raiser.

4. The process of claim 3 wherein the tube sheet is provided with a cylindrical protuberance concentric with and extending from said rear face, said protuberance being integral with said tube sheet.

5. The process of claim 4 wherein the stress raiser is in the form of a groove in said rear face.

6. The process of claim 4 wherein the fluid is compressed air.

7. A process for severing a tube sheet to expose bores of hollow fibers embedded in the tube sheet, comprising
    (a) providing a generally cylindrical tube sheet made from a polymeric material and having a Shore A hardness of at least 80, said tube sheet having a rear face and a front face from which said fibers protrude, said tube sheet being provided with a circular stress raiser extending peripherally around the tube sheet at a location adjacent to said rear face;
    (b) placing the tube sheet in a closed chamber having an annular shoulder for contacting the rear face of the tube sheet to support said tube sheet, said annular shoulder having a diameter greater than the diameter of the stress raiser;
    (c) admitting compressed air into the chamber to contact the front face of the tube sheet; and
    (d) raising the pressure of the compressed air to a value sufficiently high that the compressive force applied by said air causes the tube sheet to fracture at said stress raiser.

* * * * *